Figure 1:
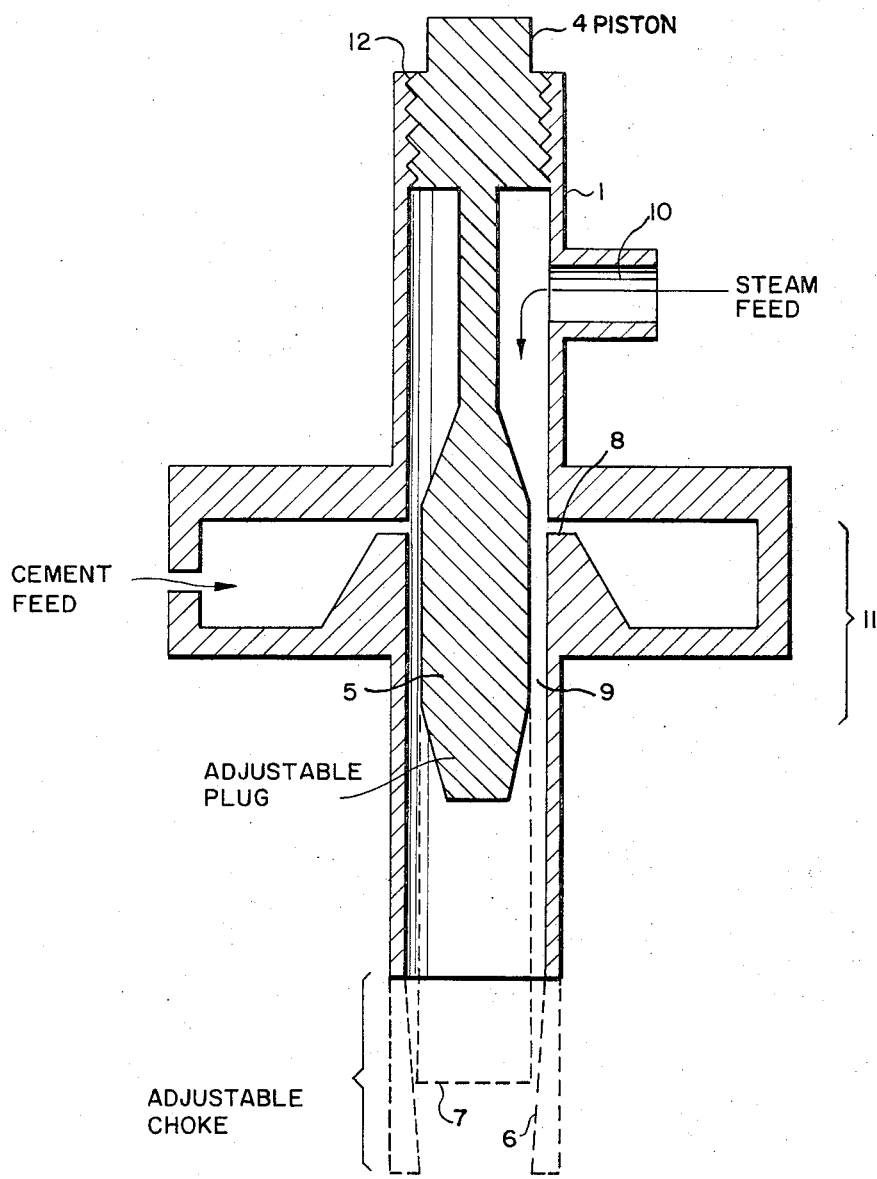

United States Patent [19]
Arnold et al.

[11] 3,804,145
[45] Apr. 16, 1974

[54] PROCESS FOR THE ISOLATION AND RECOVERY OF POLYMERS

[75] Inventors: Kenneth R. Arnold; Robert W. Frischmuth, Jr., both of Redondo Beach, Calif.

[73] Assignee: Shell Oil Company, Houston, Tex.

[22] Filed: Oct. 20, 1972

[21] Appl. No.: 299,498

Related U.S. Application Data

[63] Continuation-in-part of Ser. No. 46,075, June 15, 1970, abandoned.

[52] U.S. Cl. .............. 159/48 R, 159/49, 159/4 B, 159/6, 159/13 A
[51] Int. Cl. ........ B01d 1/16, B01d 1/22, F26b 3/12
[58] Field of Search ........ 159/16, 16 A, 13 R, 16 S, 159/DIG. 10, 4 B, 48 R, 4 ST, 6, 49, 13 A; 137/604; 260/94.7; 264/11–13; 239/408, 416, 417, 417.3, 426

[56] References Cited
UNITED STATES PATENTS

| | | | |
|---|---|---|---|
| 2,594,962 | 4/1952 | McDonald | 239/417 |
| 2,915,489 | 12/1959 | White | 260/33.6 |
| 3,050,113 | 8/1962 | Rondquist | 159/13 |
| 3,154,103 | 10/1964 | Davis et al. | 137/604 X |
| 3,202,647 | 8/1965 | Todd et al. | 260/94.7 R |
| 3,203,943 | 8/1965 | Houser et al. | 260/93.7 |
| 3,287,301 | 11/1966 | Fysh et al. | 260/94.7 R |
| 3,512,570 | 5/1970 | Ess et al. | 159/48 R |

FOREIGN PATENTS OR APPLICATIONS

| | | | |
|---|---|---|---|
| 685,246 | 4/1964 | Canada | 159/2 E |
| 1,209,205 | 10/1970 | Great Britain | 159/48 |

*Primary Examiner*—Jack Sofer

[57] ABSTRACT

A process for the isolation and recovery of a polymer in powder form from its solution is provided.

7 Claims, 2 Drawing Figures

PROCESS FOR THE ISOLATION AND RECOVERY OF POLYMERS

This is a continuation-in-part of patent application Serial Number 46,075, filed June 15, 1970, now abandoned.

This invention relates to an apparatus and process for the isolation and recovery of polymers from their solutions. More particularly, it relates to an improved process to be used in the recovery of a wider variety of polymers from their solutions at less capital outlay than prior processing wherein the product is finely divided and contains minimal residual quantities of either the solvent or water.

Background of the Invention

It is known that useful polymers which are either elastomeric or non-elastomeric in general properties may be produced in solution using such catalyst as lithium hydrocarbyls, specifically lithium alkyls. Once having synthesized the polymer in solution, it then becomes necessary to provide an adequate means and apparatus for isolating the polymer from its solvent. With certain polymers such as conjugated diene homopolymers, this may be effected by contacting the polymer solution (cements) with saturated steam under relatively low total mass flux conditions designed to flash off the bulk of the solvent, dropping the polymer crumb so formed into a hot water bath to degas the polymer, draining the water and subjecting the polymer crumb to drying conditions such as in a moving belt tunnel arrangement. While this is satisfactory for certain polymers, the crumb so formed is relatively coarse and tends to retain substantial proportions of the solvent as well as to be highly saturated with water at the beginning of the drying operation. Moreover, many polymers cannot be treated this way since due to their softening points they tend to agglomerate due to the the combination of residual solvent and elevated temperatures so that the products obtained are large sticky masses which are essentially impossible to effectively devolatilize and dehydrate.

The present invention provides at low cost an improved process of great flexibility for overcoming these difficulties and providing products amounting to those generally described as powders or particles which are essentially free of solvent and contain no more than small proportions of water even before any subsequent drying operations.

Objects of the Invention

It is an object of the present invention to provide a means for separating substantially all of the solvent from polymers. It is another object of the invention to devise an improved process for this purpose. It is a further object of the invention to provide an improved process for producing a powdered polymer product from some types of polymers. The above and other objects of the invention will be understood by those skilled in the art from the following description of a specific embodiment of the invention throughout which reference is made to the accompanying drawing.

Statement of the Invention

Now, in accordance with the present invention, a process is provided for the isolation of polymers from their solutions which comprises the steps of (a) feeding steam into a high shear mixing zone of the central section of a cylindrical casing, (b) feeding a film of polymer solution having a viscosity of 100–10,000 cp. into a high shear mixing zone, the solvent of said solution having a maximum boiling point below the temperature of the steam, the steam temperature being below that at which the polymer will show evidence of appreciable decomposition under the conditions of high shear contact, the ratio of steam to solution and the residence time in the mixing zone being sufficient to vaporize at least about 95% of the solvent, whereby the polymer is isolated from solution as powdered particles; (c) contacting the steam and solution under high shear conditions; (d) passing the sheared mixture to a cyclone separation zone wherein the powdered polymer which may either agglomerate or remain finely divided is separated from steam and vaporized solvent; (e) removing residual solvent; and (f) removing residual water from the particles.

Figure 2:
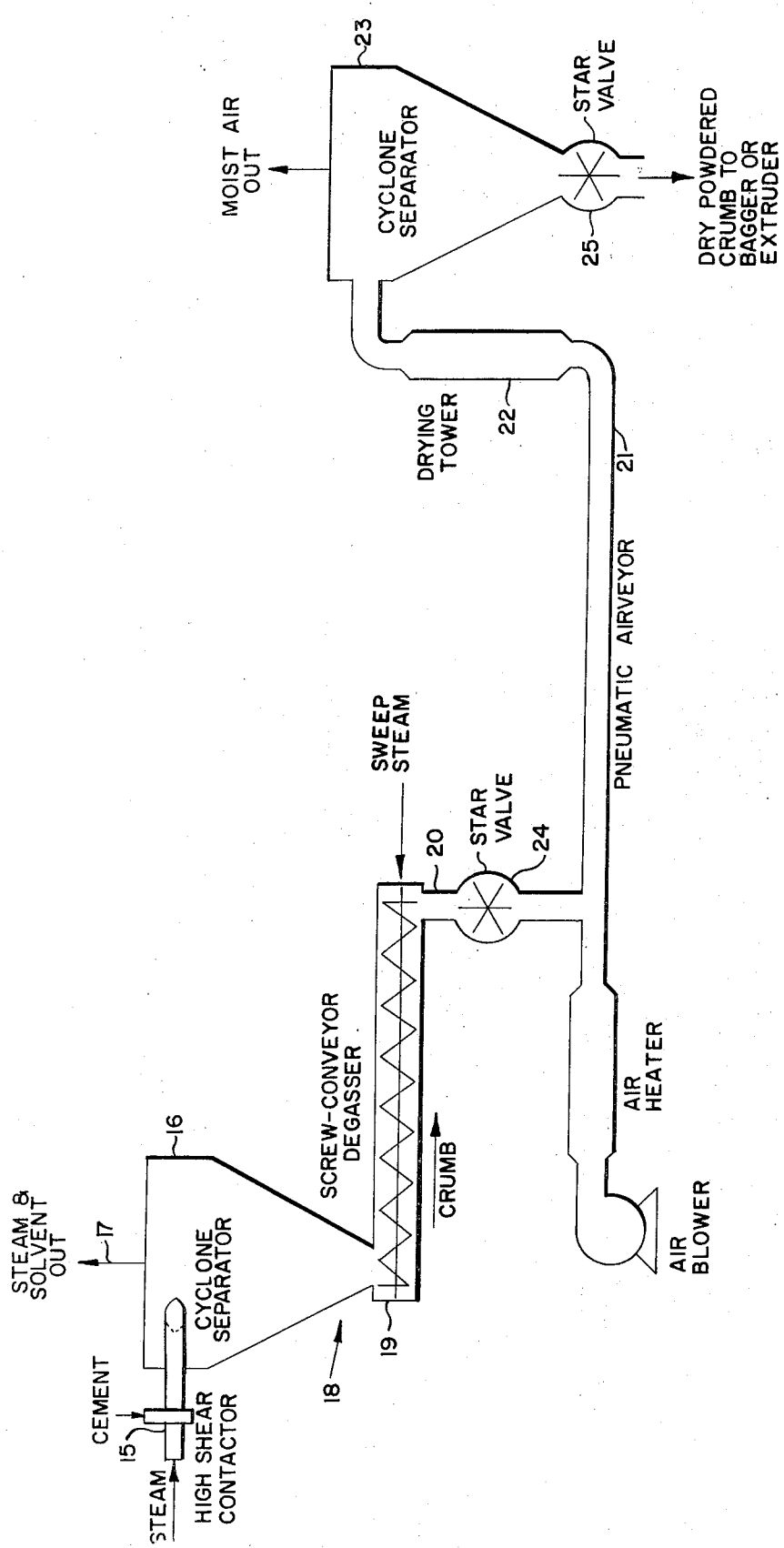

FIG. 1 is an elevation of a high shear contacting apparatus in section. FIG. 2 is a diagrammatic drawing of a general arrangement of the contacting device mounted with a separation device, useful in carrying out the process.

The polymer solutions which typify those to be treated in accordance with the present invention include such materials as polystyrene, polybutadiene, polyisoprene, styrene-butadiene copolymers and block copolymers of conjugated dienes with monoalkenyl arenes, or their hydrogenated derivatives preferably dissolved in solvents having relatively low boiling points such as alkenes, alkanes, arenes, cycloalkenes, or cycloalkanes. These include for example, mixed pentenes, mixed pentanes, cyclohexane, toluene, and mixtures thereof, the only criterion being that the solvent employed in the apparatus and process of the invention have a maximum boiling point such that it is readily vaporized upon contact with steam of a given temperature.

FIG. 1 showing a cross sectional view of the contactor preferably comprises a cylindrical casing 1 having a central zone 11 intermediate its ends. A reciprocable flow constrictor 4 is slidably mounted in said casing closing the upper end of the casing such as by means of a screw arrangement 12. The constrictor is shaped generally as shown so that the portion 5 thereof is movable within the central zone 11 to provide a narrow annular (0.04–0.32 inches) space 9 suitable for high shear contacting in said central zone. The Figure also shows an inlet 10 for introduction of hot gas or steam, preferably super-heated steam, into the portion of the casing intermediate the central zone 11 and the upper closed end of the casing 1. The cement feed is introduced through the opening 8 directly into the high shear annular space of the central zone wherein it forms a moving film which contacts the high velocity steam jet causing the cement stream to break into small particles with consequent flashing of the solvent and formation of pulverulent polymer. The mixture of steam, vaporized solvent, and polymer then exit towards the open end of the cylindrical casing at near-sonic or sonic velocities.

An improvement on the basic design is also illustrated in FIG. 1 wherein the constrictor is extended either in its entirety or by means of a connecting rod so that the gap width is decreased near the discharge, causing an increase in shear rate and overall pressure drop. This increases the amount of heat transferred from the steam to cement in the high shear mixing zone due to the higher contact pressure and thereby reduces the residual solvent. This is effected by narrowing the high shear annular space toward the exit end such as at 6. The reduced high shear gap may be effected either as shown by reducing the inner wall diameter or by flaring the lower end 7 of the constrictor or both. The constrictor is movable so as to make the apparatus adjustable to optimize the gap width near the discharge as shown in FIG. 1, the optimization being effected with specific reference to a particular polymer being isolated. The gap width strongly affects both the particle size and the amount of residual solvent remaining in the polymer when it is separated from the associated gaseous products. The length of the high shear mixing zone is also important. Increased length, hence increased residence time at high shear rate, results in reduced residual solvent. Increasing length beyond a certain point, however is ineffective.

The process of the invention is carried out by introducing the polymer solution through opening 8 into the high shear annular space and introducing super-heated or saturated steam or other hot gas through opening 10 for contact with the solution in annular space 9 where the film of cement is sheared and broken into tiny particles and the solvent is rapidly flashed, the polymer being converted at this time to a pulverulent product and passed together with vaporized solvent and steam toward the open end of the casing and thence tangentially into a cyclone separator. The use of the preferred version wherein the exit end of the casing is choked by the several alternative means described above results for many cements in a substantial reduction in residual solvent in the powdered product so obtained.

The purpose of high shear contactor is to produce finely divided crumb particles with low residual solvent and water levels enabling the process simplifications described herein.

The process of this invention does not require the relatively cumbersome prior art method of dropping a coarse crumb into water, for degassing, thereafter dewatering the crumb and subjecting it to extensive and sometimes degradative drying procedures. Secondly, the process of the invention results in greatly reduced residual solvent content for the product which in turn reduces the tack or stickiness and tendency for the polymer to agglomerate after contacting. In fact, the described process and apparatus enables the isolation in powdered form of certain polymers particularly those having high styrene contents which cannot be processed easily by prior art methods. One of the important operating variables of the process is steam super-heat. The use of super-heated steam as opposed to the previously used saturated steam has the potential of producing finely divided product having a low water content. This is of interest from a cost viewpoint in the finishing procedures expecially when water slurrying operations are omitted. The crumb can often, in fact, be separated from the vapor stream and fed directly to mechanical devolatilizing and/or extruding equipment. One of the surprising findings in the course of developing the present invention was that the polymers studied showed no evidence of decomposition under the conditions of the process.

The present invention is based upon the finding that the contactor geometry allows a certain residence time at high shear rate to produce a powdered product of lowest residual solvent. The high shear annular space in the central zone indicated in the FIG. 1 as 9 as well as the length of this contacting space indicated in FIG. 1 as 11 determine the shear rate thereby reducing residual solvent in the powdered product. The gap length 11 also reduces residual solvent. As the length is increased, the residence time under shearing conditions is also increased.

In the choked design wherein the lower end of the contactor has smaller gap width which when partially closed throttles the flow of crumb and vapor thereby forcing the contact to occur at higher pressure, a crumb results of lower residual solvent than that obtained with the basic design which does not include the optional choke. The reason for this appears to be that the pressure versus length contour is different; the choked contactor provides a longer residence time at high pressure as compared with a linear plug of equal length and overall pressure drop.

While near-sonic velocities of the mass flux (crumb, solvent vapor and steam) is not essential, it is highly desirable that the velocity thereof be in excess of 1000 ft./sec. at the contactor exit. This results in finer particles containing minimum residual solvent and condensed steam. In the prior art processes, resulting in coarse crumbs, the residual solvent was in the order of 5–12% and required degassing times in hot water slurry of about 15 minutes. In the present process, as the discharge mass flux approaches or surpasses sonic velocity, residual solvent is in the order of 1–4% and can be degassed by steam with only a few seconds contact.

The particle size of the polymer formed in the contactor is influenced more by the contactor gap 9 than the cement gap 8. Reagglomeration after the contactor is not a serious problem if the residual solvent is low.

The width of the polymer solution injection opening does not appear to have an important effect upon the operation of the claim process.

The steam (either saturated or superheated) is preferably applied under steam pressure in excess of about 100 psig, still more preferably above about 150 psig, eg. 150–700 psig. The steam to cement ratio is an important factor in determining the residual solvent in the powdered product. At a ratio of 1.0, the residual solvent under a standard set of conditions may be in the order of about 2%. However, as the steam to cement weight ratio increases from about 1.4 to 2.6, the residual solvent decreases to figures substantially lower than this.

The super heat of the steam is described as the temperature above saturation temperature, thus saturated steam has a super heat of 0°F.

When using superheated steam no off color or degraded polymer products were encountered even at steam temperatures in the order of 700°F. When using superheated steam, the powdered polymer crumb temperatures at the exit of the contactor were found to be surprisingly low and far from equal to the vapor temperature. In fact, in many cases the exit vapors remained superheated while water of various amounts condensed in the crumb.

The concentration of polymer in its solvent has a bearing on the operation of the present process but it is not one of the more important factors in the successful operation of the invention.

When considering a preferred direct solid-vapor separation, degassing, and dry crumb post contact handling system, both residual solvent and water are of primary concern. The lower the water level, the more easily the crumb is dried. Water is produced by the condensation of steam necessary to flash the solvent from the cement. Therefore, the important variables affecting water content of the powdered product are polymer concentration of the cement, steam superheat, cement feed temperature, steam to cement ratio, and steam supply pressure. Higher water contents result from relatively low polymer solids in the cement feed. On the other hand, highly superheated steam results in reduced water contents. Still further reduction in water content is effected by preheating the polymer solution feed. The only limits to preheating polymer solution feed are to avoid polymer degradation and to avoid solvent flashing before issuing through the cement gap. Increasing the steam to cement ratio also reduces water content but steam pressure appears to have little effect upon water content. Thus the water content in the powdered product is most strongly affected by cement concentration, steam superheat and cement feed temperature.

One of the most beneficial characteristics of the above described high shear contactor lies in the low residual solvent and water contents, as well as the fine particle size of the effluent crumb. These aspects may be capitalized upon by designing a recovery system which does not involve a water slurry. The low residual solvent means that the crumb is less sticky, thus enabling a dry handling method. The small particle size means that the handling with a water slurry may introduce certain dewatering problems. Consequently, it is preferred that the contactor be installed on a cyclone separator such that the crumb and vapor stream enter tangentially. Solvent vapor and steam are removed from the top of the cyclone. Crumb exits from the bottom of the cyclone into a degassing unit such as a pipeline, screw conveyor or similar device used to degas the crumb. Sweep steam is passed counter-current the flow of the crumb. Finally, the crumb passes through a vapor lock such as the star valve to a hot air dryer, to remove any residual water. The conveyor and the cyclone may be coated with a material such as teflon to prevent sticking of the crumb. The small crumb particles formed dry extremely fast thus minimizing downstream drying equipment.

FIG. 2 illustrates this type of assembly. In FIG. 2, the contactor 15 has been described herein before. This is inserted into the side of cyclone separator 16 and steam and solvent vapor are removed by means of exit 17, the powdered crumb falling to the bottom exit 18. It is then passed by means of an airveyor to further treating devices such as drying tower 22 and a second cyclone 23. Vapor losses are minimized by star valves 24 and 25.

Various optional equipment and process steps may be utilized. These include, for example, elimination of degassing (unless this is required), use of grinding equipment, and use of extruder driers or devolatilizing extruders, as well as compounding stages for injection fillers, oil, resins, etc.

We claim as our invention:

1. In a process for the recovery of polymers from their solutions the steps comprising:
    a. feeding steam under a pressure of at least about 150 psig into a high shear mixing zone of the central section of a cylindrical casing;
    b. feeding a film of the polymer solution into the high shear mixing zone, the hydrocarbon solvent to said solution having a maximum boiling point below the temperature of the steam;
    c. contacting the steam and solution in the high shear zone whereby at least 95% of the solvent is vaporized, and solid polymer particles are formed;
    d. passing the mixture of particles in substantially dry powdered or slightly agglomerated form, vaporized solvent, and steam to a cyclone separator, whereby solvent vapors and steam are separated from said polymer powder particles, said particles bearing condensed steam and residual solvent in minor amounts;
    e. substantially freeing the particles from solvent with sweep steam
    f. and substantially freeing the particles from condensed steam with hot air.

2. A process according to claim 1 wherein the mixture of polymer, solvent and steam exits from the high shear zone under at least sonic conditions.

3. A process according to claim 2 wherein the polymer being recovered is selected from the group consisting of block copolymers of monoalkenyl arenes with conjugated dienes and hydrogenated derivatives of the same.

4. A process according to claim 1 wherein superheated steam is utilized in step a.

5. A process according to claim 1 wherein the steam: polymer solution weight ratio in step c immediately prior to contact is between about 0.5 and 3.0.

6. A process for the recovery of polymers from their solutions according to claim 1 which comprises:
    a. feeding steam superheated 100 to 500°F above saturation temperature at 150 to 700 psig into a high shear mixing zone;
    b. feeding a film of a hydrocarbon solution of a polymer into said zone, said polymer being selected from the group consisting of block copolymers of monoalkenyl arenes with conjugated dienes and hydrogenation products thereof;
    c. contacting the steam and solution in the high shear zone whereby at least about 98% of the hydrocarbon solvent is vaporized at least when the mixture exits from the zone under at least sonic conditions, said mixture upon exit comprising substantially dried polymer powder or slightly agglomerated particles bearing superficial amounts of residual solvent and condensed steam together with steam and vaporized solvent;
    d. passing the mixture tangentially into a cyclone separator whereby the particles are separated from the gaseous components of the mixture;
    e. substantially freeing the particles from residual solvent by contact with sweep steam;
    f. and substantially freeing the particles from condensed steam by drying with hot air.

7. In a process for the recovery of polymers from their solutions the steps comprising:
    a. feeding steam under a pressure of at least about 150 psig into a high shear mixing zone of the central section of a cylindrical casing;

b. feeding a film of the polymer solution into the high shear mixing zone, the hydrocarbon solvent of said solution having a maximum boiling point below the temperature of the steam;

c. contacting the steam and solution in the high shear zone whereby at least 95% of the solvent is vaporized, and solid polymer particles are formed;

d. passing the mixture of particles in substantially dry powdered or slightly agglomerated form, vaporized solvent, and steam to a cyclone separator, whereby solvent vapors and steam are separated from said polymer powder particles, said particles bearing condensed steam and residual solvent in minor amounts;

e. passing the mixture of resulting particles from step d thru a devolitilizing extruder which devolatilizes, dries, extrudes and pelletizes the product.

* * * * *

PO-1050
(5/69)

UNITED STATES PATENT OFFICE
CERTIFICATE OF CORRECTION

Patent No. __3,804,145__      Dated __APRIL 16, 1974__

Inventor(s) __KENNETH R. ARNOLD and ROBERT W. FRISCHMUTH, JR.__

It is certified that error appears in the above-identified patent and that said Letters Patent are hereby corrected as shown below:

In the Figure forming a part of the abstract and also in Figure II, apparatus item 21, replace "AIRVEYOR" with -- CONVEYOR --.

In the specification, Column 5, Line 56, replace "an airveyor" with -- a conveyor --.

Signed and sealed this 29th day of October 1974.

(SEAL)
Attest:

McCOY M. GIBSON JR.
Attesting Officer

C. MARSHALL DANN
Commissioner of Patents